US012013757B2

(12) United States Patent
Raz

(10) Patent No.: US 12,013,757 B2
(45) Date of Patent: Jun. 18, 2024

(54) NODE FAILURE SOURCE DETECTION IN DISTRIBUTED COMPUTING ENVIRONMENTS USING MACHINE LEARNING

(71) Applicant: RED HAT, INC., Raleigh, NC (US)

(72) Inventor: Or Raz, Rishon Lezion (IL)

(73) Assignee: Red Hat, Inc., Raleigh, NC (US)

( * ) Notice: Subject to any disclaimer, the term of this patent is extended or adjusted under 35 U.S.C. 154(b) by 46 days.

(21) Appl. No.: 17/977,010

(22) Filed: Oct. 31, 2022

(65) Prior Publication Data

US 2024/0143446 A1    May 2, 2024

(51) Int. Cl.
G06F 11/14    (2006.01)
G06N 20/00    (2019.01)

(52) U.S. Cl.
CPC ......... G06F 11/1417 (2013.01); G06N 20/00 (2019.01); *G06F 2201/805* (2013.01)

(58) Field of Classification Search
CPC .............. G06F 11/1417; G06F 2201/805; G06N 20/00
See application file for complete search history.

(56) References Cited

U.S. PATENT DOCUMENTS

| | | | |
|---|---|---|---|
| 8,266,474 B2 | 9/2012 | Goel | |
| 10,049,023 B1* | 8/2018 | Bhalerao | ............. G06F 11/2035 |
| 10,133,619 B1 | 11/2018 | Nagpal et al. | |
| 10,607,155 B2* | 3/2020 | Shen | ............... G06F 9/5038 |
| 10,769,007 B2 | 9/2020 | Chintalapati et al. | |
| 2020/0348984 A1 | 11/2020 | Giannetti et al. | |

FOREIGN PATENT DOCUMENTS

CN    112860525 A    5/2021

OTHER PUBLICATIONS

"Deploying node health checks by using the Node Health Check Operator", https://docs.openshift.com/container-platform/4.9/nodes/nodes/eco-node-health-check-operator.html#:~:text=The%20Operator%20uses%20controller,to%20determine%20the%20node's%20health, Red Hat, 2022; pp. 1-9.

Lin et al., "Predicting Node Failure in Cloud Service Systems", https://hongyujohn.github.io/NodeFailures.pdf, 2018; pp. 480-490.

Demaria, Andrew, "Automatic Remediation of Kubernetes Nodes", https://blog.cloudflare.com/automatic-remediation-of-kubernetes-nodes/, Jul. 15, 2021; pp. 1-16.

* cited by examiner

*Primary Examiner* — Nadeem Iqbal
(74) *Attorney, Agent, or Firm* — Kilpatrick Townsend & Stockton LLP

(57) ABSTRACT

Sources of node failures in distributed computing environments can be determined using machine learning according to some aspects described herein. For example, prior to rebooting a node in a distributed computing environment, a computing system can execute a software agent to detect a failure with respect to the node. In response to detecting the failure, the computing system can input characteristics for the node into a trained machine learning model. The computing system can receive a source of the failure with respect to the node. The computing system can then automatically execute a recovery operation for the node based on the source of the failure.

20 Claims, 3 Drawing Sheets

NODE FAILURE SOURCE DETECTION IN DISTRIBUTED COMPUTING ENVIRONMENTS USING MACHINE LEARNING

TECHNICAL FIELD

The present disclosure relates generally to distributed computing environments and, more particularly (although not necessarily exclusively), to detecting sources of node failures in distributed computing environments using machine learning.

BACKGROUND

Distributed computing systems (e.g., cloud computing systems, data grids, and computing clusters) have recently grown in popularity given their ability to improve flexibility, responsiveness, and speed over conventional computing systems. These distributed computing environments may include dozens or hundreds of nodes interconnected via one or more networks. The nodes can be physical machines executing software processes, such as microservices, serverless functions, and applications. The nodes can execute the software processes to service various types of computer workloads ("workloads"), such as video conferencing, web surfing, voice communications, and data processing workloads.

DETAILED DESCRIPTION

Figure 1:
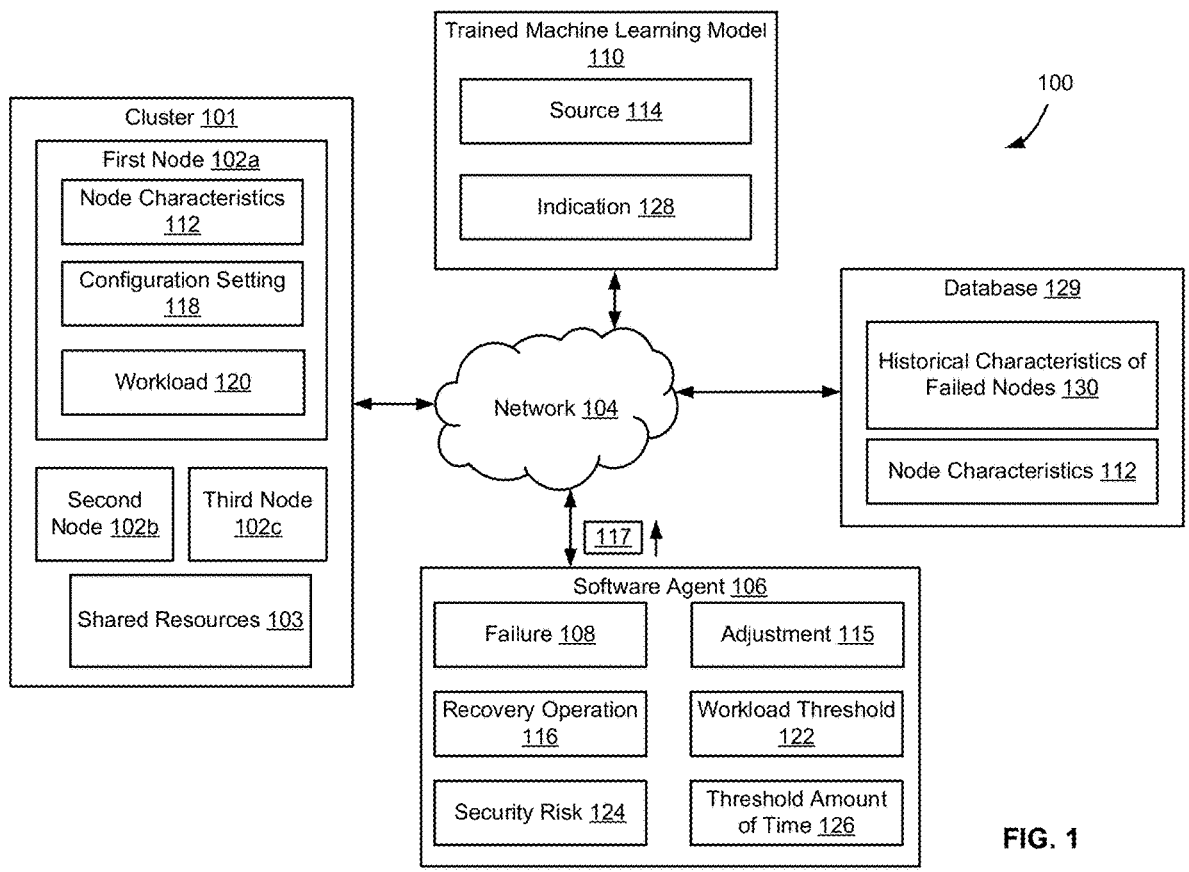
FIG. 1 is a block diagram of an example of a distributed computing environment for determining a source of a failure of a node using machine learning according to one example of the present disclosure.

A distributed computing environment can include dozens or hundreds of nodes that can execute software processes. As the number of nodes in the distributed computing environment increases, so does a likelihood that individual nodes may fail. For example, failure of a node can involve a loss of connection to other nodes in the distributed computing environment or a malfunction of the node's typical processes. The node may have access or control over shared resources in the distributed computing environment that can become vulnerable due to the node's failure. Failed nodes are fenced (e.g., isolated from other nodes in the distributed computing environment) to disable or reboot the node and prevent the node from accessing the shared resources. But it can be difficult or impossible to detect a source of the failure before fencing the node, particularly for nodes that have lost connectivity to the distributed computing environment. As the source of the failure may be unknown, some nodes may continue to experience failure without the source of the failure being addressed. Having to regularly reboot or disable failed nodes can significantly increase latency in the distributed computing environment.

Some examples of the present disclosure overcome one or more of the abovementioned problems by using machine learning to determine a source of a failure of a node before the failed node is rebooted. The machine learning model can be trained with a database of node characteristics for nodes that previously failed. Rather than automatically fencing a node when a failure indication is detected for the node, characteristics of the node can first be inputted into the trained machine learning model. The trained machine learning model can output a source of the failure for the node. Recovery operations for the node can then be automatically executed based on the source. For example, a node that simply lost network connection may be reconnected without rebooting the node. In another example, a node that has malfunctioned due to a cybersecurity attack may be disabled and isolated from other nodes in the distributed computing environment. Thus, sources of node failures can be addressed when they initially arise. And, further recovery operations for failed nodes can be implemented beyond fencing.

In one particular example, a distributed computing environment including multiple nodes can be monitored by a software agent. The software agent can detect if any nodes in the distributed computing environment are experiencing failure. The software agent may check node characteristics of the various nodes against predefined criteria or thresholds, and can detect a failure of a node if any node characteristics are outside of or exceed the criteria or thresholds. For example, the software agent may determine that available memory for a particular node is lower than a memory threshold. Before (or instead of) fencing the failed node, the node characteristics can be inputted into a trained machine learning model. The trained machine learning model can return a source of the failure. For example, the source of the failure can include excessive programs or processes running on the node causing the node memory to be too low. The failed node can then be recovered by reallocating a portion of the processes running on the failed node to another healthy node.

In some examples, the trained machine learning model can be used to predict potential failures of particular nodes. For example, node characteristics can be inputted into the trained machine learning model at regular intervals. Additionally or alternatively, node characteristics for a node identified as high risk may be inputted into the trained machine learning model after the node is rebooted. The trained machine learning model can return an indication of a future failure for a particular node. For example, the trained machine learning model can return an indication that a particular node may disconnect from the network in the distributed computing environment. To prevent the potential failure, network configuration settings for the node can be automatically reset to prevent disconnection.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a distributed computing environment 100 for determining a source 114 of a failure 108 of a node using machine learning according to one example of the present disclosure. In this example, the distributed computing environment 100 can be a cloud computing environment, a computing cluster, or a data grid. The distributed computing environment 100 includes a cluster 101 of multiple nodes 102*a-c* that may be communicatively coupled to one another via one or more networks 104, such as a local area network or the Internet. The nodes 102*a-c* can execute software processes to service various types of workloads for clients. For example, the nodes 102*a-c* may execute software processes configured to service data-processing workloads submitted by clients and return the results thereof to back to the clients. The nodes 102*a-c* can access shared resources 103 for the cluster 101 to execute the software processes. Examples of the nodes 102*a-c* can include computing devices, servers, virtual machines, or any combination of these.

The distributed computing environment 100 can also include a software agent 106 that can monitor the nodes 102*a-c* for failures. The software agent 106 may detect a failure 108 for a first node 102*a*. In some examples, the software agent 106 may detect that certain node characteristics 112, such as disk pressure, memory pressure, workload, or network configurations, may be outside of predefined thresholds. For example, the first node 102*a* may not have enough memory to execute a client request received from a client device. In other examples, the software agent 106 may detect that the first node 102*a* is malfunctioning. For example, the software agent 106 may detect that the first node 102*a* is receiving client requests but not fulfilling the client requests. Or, the software agent 106 may detect that the first node 102*a* is attempting to access the shared resources 103 in the distributed computing environment 100 without proper permissions to do so. In further examples, the software agent 106 may detect that the first node 102*a* is unreachable via the network 104. In any such case, the software agent 106 can detect that the first node 102*a* has experienced a failure 108.

In response to detecting the failure 108, a trained machine learning model 110 can be used to determine a source 114 of the failure 108 using node characteristics 112 of the first node 102*a*. The node characteristics 112 can include the disk pressure, memory pressure, and so forth of the first node 102*a* as described above, and can further include node relationships, permissions, and software or hardware characteristics of the first node 102*a*. For example, the node characteristics 112 can include historical actions, operating systems, amount of RAM, number of CPUs, and applications or other software running on the first node 102*a*. Further, the node characteristics 112 can include hierarchical relationships between the first node 102*a* and the other nodes 102*b-c* in the distributed computing environment 100. For example, the first node 102*a* may be a master node that manages the second node 102*b* and the third node 102*c*, which may be worker nodes.

Examples of the trained machine learning model 110 can include neural networks, classifiers, support vector machines, and decision trees. Additionally, the trained machine learning model 110 can be a deep learning model that uses graphic neural networks (GNN) or convolutional neural networks (CNN). The trained machine learning model 110 can be generated by training a machine learning model with historical characteristics of failed nodes 130 stored in the database 129. In some examples, the trained machine learning model 110 can also be trained with identified sources of failure for the failed nodes in association with node characteristics. The software agent 106 can provide the node characteristics 112 of the first node 102*a* as an input to the trained machine learning model 110. Based on the input, the trained machine learning model 110 can output a source 114 of the failure 108 with respect to the first node 102*a*. For example, the software agent 106 may have identified a failure 108 of the first node 102*a* involving mismanagement of client requests. The trained machine learning model 110 can output a source 114 involving an identification of a cybersecurity attack on the first node 102*a* that is causing the mismanagement. In another example, the failure 108 of the first node 102*a* can involve the first node 102*a* not being connected to the network 104. The source 114 output by the trained machine learning model 110 can include an identification that software executing on the first node 102*a* is out of date, thus causing the network connectivity issues.

Based on the source 114 of the failure 108, the software agent 106 can implement a recovery operation 116 for the first node 102*a*. In some examples, the recovery operation 116 can involve automatically adjusting a configuration setting 118 for the first node 102*a*. For example, the source 114 of the failure 108 can include a misapplied configuration setting 118, such as a network setting that prevented the first node 102*a* from connecting to the network 104. The software agent 106 can determine an adjustment 115 to the configuration setting 118, such as by checking configuration settings for other healthy nodes. Then, the software agent 106 can transmit a command 117 to the first node 102*a* to execute the adjustment 115 to the configuration setting 118. The first node 102*a* can execute the adjustment 115 in response to receiving the command 117. After transmitting the command 117, the software agent 106 can receive an indication or determine that the configuration setting 118 has been adjusted. For example, the software agent 106 may receive confirmation, such as in a message from the first node 102*a*, that the adjustment 115 to the configuration setting 118 has been executed. In some examples, the software agent 106 may detect that the configuration setting 118 has been adjusted. For example, if the adjustment 115 is for a network setting that was preventing the first node 102*a* from connecting to the network 104, the software agent 106 may detect that the first node 102*a* is once again connected to the network 104. This can indicate that the adjustment 115 was executed. Adjusting the configuration setting 118 may prevent reoccurrence of the failure 108.

In another example, the source 114 of the failure 108 may include a relatively high workload 120 for the first node 102*a*. For example, the source 114 may include a relatively high number of client requests to the first node 102*a*. Alternatively or additionally, the source 114 may include relatively high memory usage or disk pressure for the first node 102*a*. In such cases, the software agent 106 may compare the workload 120 to a workload threshold 122 for the first node 102*a*. If the workload 120 exceeds the workload threshold 122, the software agent 106 may automatically redirect at least a portion of the workload 120 for the first node 102*a* to another node. For example, the software agent 106 may determine a portion of the workload 120 for the first node 102*a* to be redirected to the second node 102*b*, which may have a relatively low workload. The portion of the workload 120 that is redirected may allow the workload 120 for the first node 102*a* to be below the workload threshold 122. For example, the software agent 106 may redirect a percentage, such as 30%, of network traffic for the first node 102*a* to the second node 102*b*.

In some examples, the source 114 of the failure 108 can involve a security risk. For example, the source 114 can be a cybersecurity attack on the first node 102*a*. The software agent 106 may include a lookup table of security risks 124 associated with sources 114 that can be output by the trained machine learning model 110. If the software agent 106 determines that the source 114 of the failure 108 is associated with a security risk 124, the software agent 106 can automatically isolate the first node 102a from the other nodes 102b-c in the distributed computing environment 100, such as in a traditional fencing operation. For example, the software agent 106 can prevent the first node 102a from accessing shared resources 103 available to the nodes 102a-c in the cluster 101 or the distributed computing environment 100, such as by restricting permissions for the first node 102a. The software agent 106 can additionally transmit a command 117 to the first node 102a to disconnect the first node 102a from the network 104. Disconnecting the first node 102a from the network 104 may prevent the first node 102a from communicating with the other nodes 102b-c. The software agent 106 can then detect that the first node 102a is disconnected from the network 104 to confirm that the first node 102a is isolated. Thus, the shared resources 103 in the distributed computing environment 100 can be protected from the failure 108 of the first node 102a.

The node characteristics 112 may be inputted to the trained machine learning model 110 in response to detection of the failure 108 and before the first node 102a is automatically fenced. Based on the source 114 output by the trained machine learning model 110, the first node 102a may or may not be fenced. In other examples, the first node 102a may be automatically fenced after detection of the failure 108, and node characteristics 112 can be inputted into the trained machine learning model 110 during or after fencing of the first node 102a.

Alternatively or additionally, the node characteristics 112 can be inputted into the trained machine learning model 110 at regular intervals. For example, the software agent 106 may determine that a threshold amount of time 126 has been exceeded. Examples of the threshold amount of time 126 can include ten minutes, one hour, or one day. In response to exceeding the threshold amount of time 126, the software agent 106 can input node characteristics 112 of the first node 102a to the trained machine learning model 110, regardless of the current health of the first node 102a. For example, the first node 102a may be a currently healthy node that has previously failed repeatedly, and therefore may be likely to fail again. Therefore, the software agent 106 may input the node characteristics 112 after the threshold amount of time 126 is exceeded.

Based on the input, the trained machine learning model 110 may output an indication 128 of a future failure with respect to the first node 102a. For example, the indication 128 may be a source of a potential failure for the first node 102a. In one example, the indication 128 can involve an out-of-date operating system for the first node 102a that may leave the first node 102a vulnerable to cybersecurity attacks by malicious entities. In another example, the indication 128 can involve a hardware malfunction of the first node 102a. The software agent 106 can automatically execute a recovery operation 116 for the first node 102a based on the indication 128 of a future failure. In some examples, executing such recovery operations 116 for healthy nodes 102a-c can prevent the potential node failures, which can prevent nodes 102a-c from going offline. Thus, latency can be reduced and performance of the distributed computing environment 100 can be improved.

After the source 114 of the failure 108 is received and the recovery operation 116 is executed, the database 129 can be updated to include the node characteristics 112 and the source 114. In some examples, the trained machine learning model 110 can be further trained using the node characteristics 112 of the first node 102a with respect to its failure. Continuously updating the trained machine learning model 110 with additional historical data can improve the sources 114 identified by the trained machine learning model 110.

Although FIG. 1 depicts a certain number and arrangement of components, this is for illustrative purposes and intended to be non-limiting. Other examples may include more components, fewer components, different components, or a different arrangement of the components shown in FIG. 1. For example, although the distributed computing environment 100 includes three nodes and one software agent, any number of nodes or software agents can be included.

Figure 2:
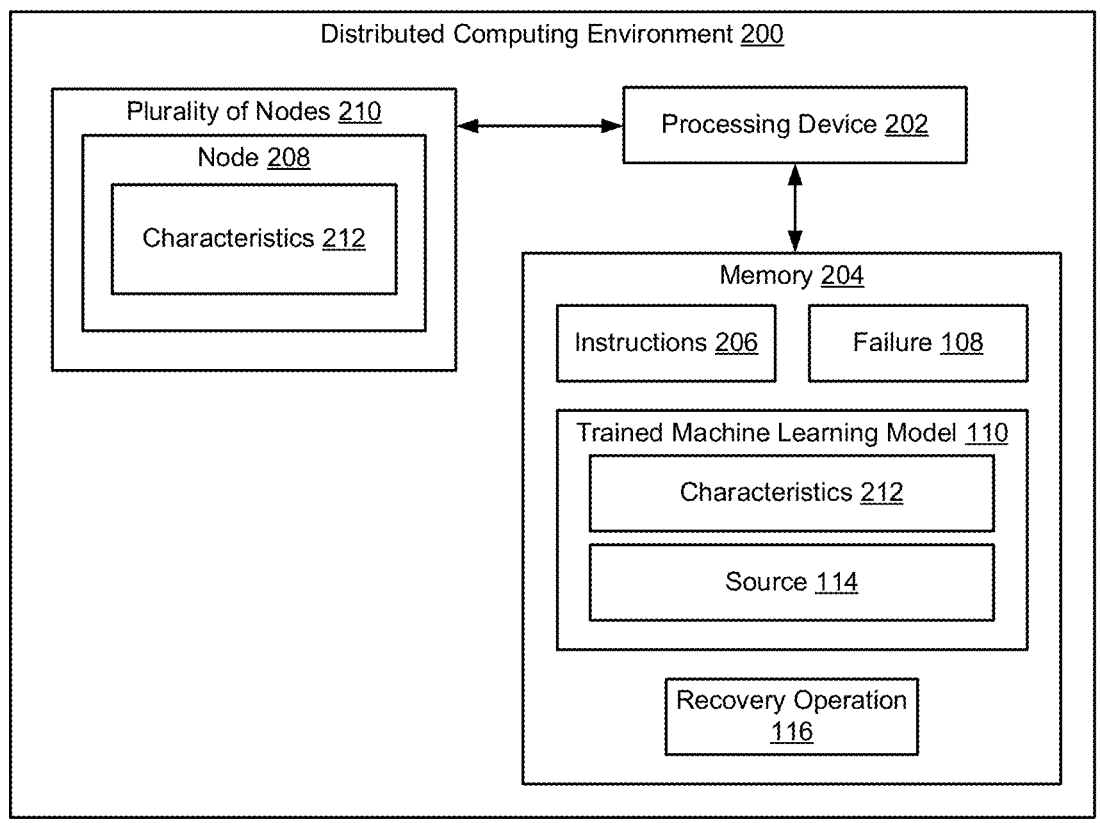
FIG. 2 is a block diagram of another example of a distributed computing environment for determining a source of a failure of a node using machine learning according to one example of the present disclosure.

FIG. 2 is a block diagram of another example of a distributed computing environment 200 for determining a source of a failure 214 of a node 208 using machine learning according to one example of the present disclosure. The distributed computing environment 200 includes a processing device 202 communicatively coupled to a memory 204. The processing device 202 can include one processing device or multiple processing devices. Non-limiting examples of the processing device 202 include a Field-Programmable Gate Array (FPGA), an application-specific integrated circuit (ASIC), a microprocessor, etc. The processing device 202 can execute instructions 206 stored in the memory 204 to perform the operations. In some examples, the instructions 206 can include processor-specific instructions generated by a compiler or an interpreter from code written in any suitable computer-programming language, such as C, C++, C #, etc.

Memory 204 can include one memory device or multiple memory devices. The memory 204 can be non-volatile and may include any type of memory device that retains stored information when powered off. Non-limiting examples of the memory 204 include electrically erasable and programmable read-only memory (EEPROM), flash memory, or any other type of non-volatile memory. At least some of the memory 204 can include a non-transitory computer-readable medium from which the processing device 202 can read instructions 206. A computer-readable medium can include electronic, optical, magnetic, or other storage devices capable of providing the processing device 202 with computer-readable instructions 206 or other program code. Examples of a computer-readable medium can include magnetic disks, memory chips, ROM, random-access memory RAM, an ASIC, a configured processor, optical storage, or any other medium from which a computer processor can read instructions 206.

The processing device 202 can execute instructions 206 to reboot a node 208 in a plurality of nodes 210 in the distributed computing environment 200. In some examples, prior to rebooting the node 208, the processing device 202 can detect a failure 108 with respect to the node 208. In response to detecting the failure 108, the processing device 202 can input characteristics for the node 208 into a trained machine learning model 110. The processing device 202 can receive, from the trained machine learning model 110, a source of the failure 214 with respect to the node 208. The processing device 202 can then automatically execute a recovery operation 116 for the node 208 based on the source of the failure 214.

Figure 3:
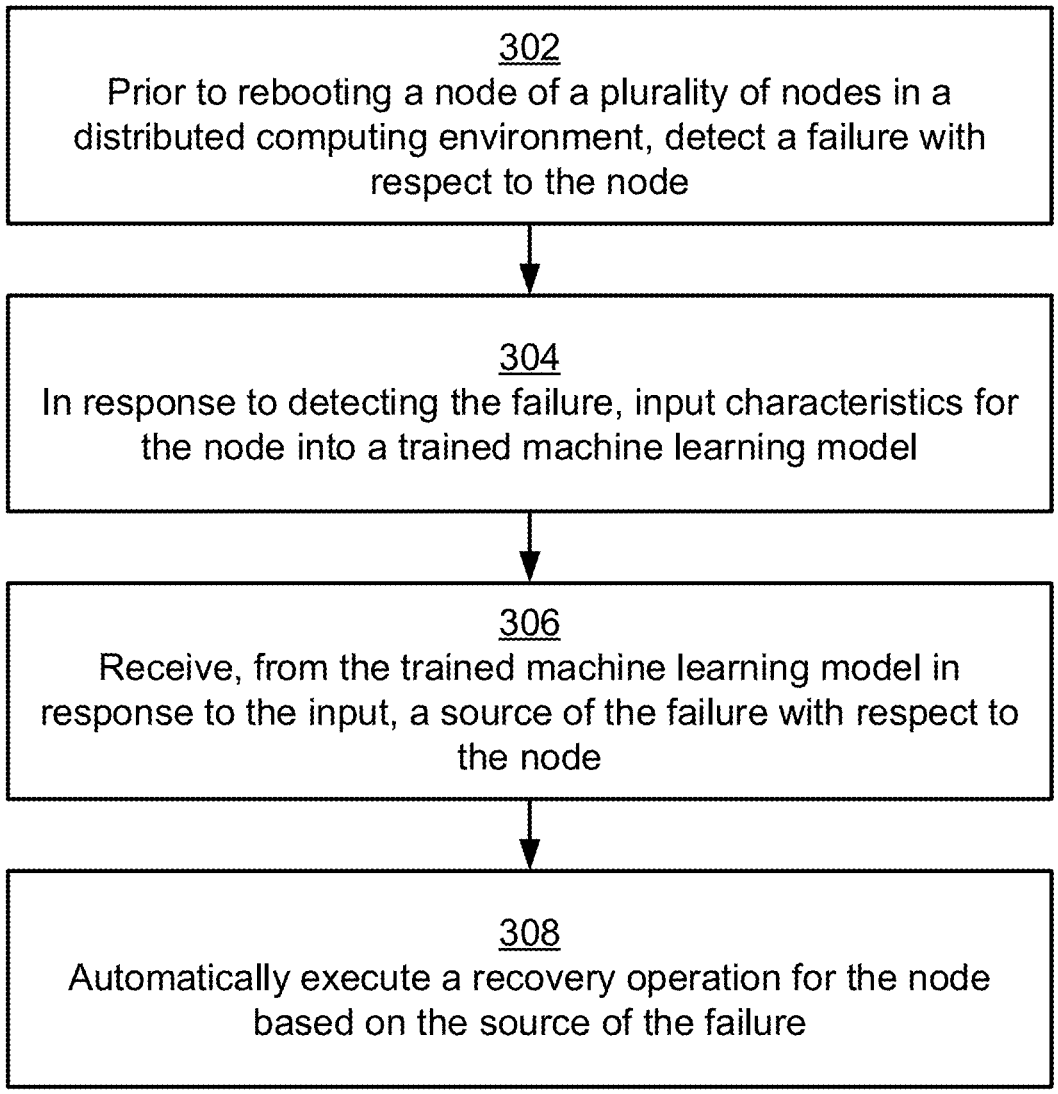
FIG. 3 is a flowchart of a process for determining a source of a failure of a node in a distributed computing environment using machine learning according to one example of the present disclosure.

FIG. 3 is a flowchart of a process for determining a source of a failure 214 of a node 208 in a distributed computing environment 200 using machine learning according to one example of the present disclosure. FIG. 3 is described with references to components in FIGS. 1-2. Other examples can include more steps, fewer steps, different steps, or a different order of the steps than is depicted in FIG. 3.

At step 302, the process involves, prior to rebooting a node 208 of a plurality of nodes 210 in a distributed computing environment 200, detecting, by the processing device 202, a failure 108 with respect to the node 208. For example, the processing device 202 can detect that the node 208 has crashed and is no longer performing its typical functions. In one example, nodes in the distributed computing environment 200 can be managed by a container orchestration platform, such as Kubernetes. The Kubernetes environment can include operators (e.g., controllers or software agents) that can make use of one or more custom resources to manage the nodes. For example, a first operator may create a first custom resource to monitor the node 208 to detect the failure 108. Additionally, the node 208 can be a first node 102a in a cluster 101 of nodes 102a-c that are all monitored by the first custom resource, which can detect that the second node 102b and the third node 102c have also failed. The node 208 can be a master node, and the second node 102b and third node 102c can be worker nodes. The node 208 can control and manage the second node 102b and the third node 102c.

At step 304, the process involves, in response to detecting the failure 108, inputting, by the processing device 202, characteristics 212 for the node 208 into a trained machine learning model 110. For example, the first operator may create a second custom resource that can transmit the characteristics to the trained machine learning model 110. The processing device 202 may determine that the failures 108 of the second node 102b and the third node 102c may be related to the failure 108 of node 208. For example, all three nodes may have experienced failure 108 substantially contemporaneously. In typical clusters including three nodes, a failure of the master node will result in a worker node being designated as the new master node. So, all three nodes failing at the same time may indicate a related failure 108. Therefore, the processing device 202 may additionally input node characteristics for the second node 102b and the third node 102c to the trained machine learning model 110.

At step 306, the process involves receiving, by the processing device 202 and from the trained machine learning model 110, a source 114 of the failure 108 with respect to the node 208. The source 114 can involve corrupted software executing on the node 208 causing the node 208 to fail. Because the second node 102b and the third node 102c are worker nodes controlled by the node 208, the second node 102b and the third node 102c may have additionally failed due to the corrupted software executing on the node 208.

At step 308, the process involves automatically executing, by the processing device 202, a recovery operation 116 for the node 208 based on the source 114 of the failure 108. The recovery operation 116 can involve isolating the node 208 and nodes 102b-c from other nodes in the distributed computing environment 200. For example, the operator may generate a third custom resource that acts as a "poison pill" to shut down the node 208. Additionally, the recovery operation 116 can involve rebooting the node 208. In some examples, rebooting the node 208 may resolve the corrupted software issue. Additionally, rebooting the node 208 may resolve the failure of the second node 102b and the third node 102c. In other examples, the processing device 202 can detect that the node 208 is continuing to experience failure 108. In response, the processing device 202 can attempt another recovery operation 116, such as updating the corrupted software on the node 208. Alternatively or additionally, the processing device 202 can input characteristics for the node 208 into the trained machine learning model 110 again to receive an additional source 114 of the failure 108.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a processing device; and
a non-transitory computer-readable memory comprising instructions for causing the processing device to, prior to rebooting a node of a plurality of nodes in a distributed computing environment:
detect a failure with respect to the node; and
in response to detecting the failure:
input characteristics for the node into a trained machine learning model;
receive, from the trained machine learning model, a source of the failure with respect to the node; and
automatically execute a recovery operation for the node based on the source of the failure.

2. The system of claim 1, wherein the non-transitory computer-readable memory further comprises instructions executable by the processing device for causing the processing device to, prior to detecting the failure with respect to the node:
determine that a threshold amount of time has been exceeded;
in response to determining that the threshold amount of time has been exceeded, input characteristics for the node into the trained machine learning model; and
in response to inputting characteristics of the node into the trained machine learning model, receive, from the trained machine learning model, an indication of a future failure with respect to the node.

3. The system of claim 2, wherein the non-transitory computer-readable memory further comprises instructions executable by the processing device for causing the processing device to:
automatically execute the recovery operation for the node based on the indication of the future failure of the node.

4. The system of claim 1, wherein the source of the failure is a configuration setting for the node, and wherein the non-transitory computer-readable memory further comprises instructions executable by the processing device for causing the processing device to automatically execute the recovery operation by:
determining an adjustment to the configuration setting for the node to prevent reoccurrence of the failure with respect to the node;
transmitting a command to the node comprising the adjustment to the configuration setting, wherein the node is configured to execute the adjustment to the configuration setting in response to receiving the command; and
receiving, from the node, confirmation of the adjustment to the configuration setting.

5. The system of claim 1, wherein the source of the failure is a workload for the node, and wherein the non-transitory computer-readable memory further comprises instructions executable by the processing device for causing the processing device to automatically execute the recovery operation by:
determining, based on the source of the failure, that the workload for the node exceeds a workload threshold;

determining a portion of the workload for the node to be redirected to cause the workload for the node to be below the workload threshold; and redirecting at least the portion of the workload to another node in the plurality of nodes.

6. The system of claim 1, wherein the non-transitory computer-readable memory further comprises instructions executable by the processing device for causing the processing device to automatically execute the recovery operation by:

determining, based on the source of the failure, a security risk with respect to the node; and in response to determining the security risk, automatically isolating the node from other nodes in the plurality of nodes by:

preventing the node from accessing shared resources in the distributed computing environment;

transmitting a command to the node to disconnect from a network configured to communicatively couple the plurality of nodes in the distributed computing environment; and determining that the node has disconnected from the network.

7. The system of claim 1, wherein the non-transitory computer-readable memory further comprises instructions executable by the processing device for causing the processing device to:

generate the trained machine learning model by training a machine learning model with a database comprising historical characteristics of nodes in the plurality of nodes that experienced failures; and in response to automatically executing the recovery operation, update the database with the characteristics for the node.

8. A method comprising, prior to rebooting a node of a plurality of nodes in a distributed computing environment:

detecting, by a processing device, a failure with respect to the node; and in response to detecting the node:

inputting, by the processing device, characteristics for the node into a trained machine learning model;

receiving, by the processing device, a source of the failure with respect to the node from the trained machine learning model in response to the input; and automatically executing, by the processing device, a recovery operation for the node based on the source of the failure.

9. The method of claim 8, further comprising, prior to detecting the failure with respect to the node:

determining that a threshold amount of time has been exceeded;

in response to determining that the threshold amount of time has been exceeded, inputting characteristics of the node into the trained machine learning model; and in response to inputting characteristics of the node into the trained machine learning model, receiving, from the trained machine learning model, an indication of a future failure with respect to the node.

10. The method of claim 9, further comprising:

automatically executing the recovery operation for the node based on the indication of the future failure of the node.

11. The method of claim 8, wherein the source of the failure is a configuration setting for the node, and wherein automatically executing the recovery operation further comprises:

determining an adjustment to the configuration setting for the node to prevent reoccurrence of the failure with respect to the node;

transmitting a command to the node comprising the adjustment to the configuration setting, wherein the node is configured to execute the adjustment to the configuration setting in response to receiving the command; and receiving, from the node, confirmation of the adjustment to the configuration setting.

12. The method of claim 8, wherein the source of the failure is a workload for the node, and wherein automatically executing the recovery operation further comprises:

determining, based on the source of the failure, that the workload for the node exceeds a workload threshold;

determining a portion of the workload for the node to be redirected to cause the workload for the node to be below the workload threshold; and redirecting at least the portion of the workload to another node in the plurality of nodes.

13. The method of claim 8, wherein automatically executing the recovery operation further comprises:

determining, based on the source of the failure, a security risk with respect to the node; and in response to determining the security risk, automatically isolating the node from other nodes in the plurality of nodes by:

preventing the node from accessing shared resources in the distributed computing environment;

transmitting a command to the node to disconnect from a network that communicatively couples the plurality of nodes in the distributed computing environment; and determining that the node has disconnected from the network.

14. The method of claim 8, further comprising:

generating the trained machine learning model by training a machine learning model with a database comprising historical characteristics of nodes in the plurality of nodes that experienced failures; and in response to automatically executing the recovery operation, updating the database with the characteristics for the node.

15. A non-transitory computer-readable medium comprising program code that is executable by a processing device for causing the processing device to, prior to rebooting a node of a plurality of nodes in a distributed computing environment:

detect a failure with respect to the node; and in response to detecting the failure:

input characteristics for the node into a trained machine learning model;

receive, from the trained machine learning model in response to the input, a source of the failure with respect to the node; and automatically execute a recovery operation for the node based on the source of the failure.

16. The non-transitory computer-readable medium of claim 15, further comprising program code executable by the processing device for causing the processing device to, prior to detecting the failure with respect to the node:

determine that a threshold amount of time has been exceeded;

in response to determining that the threshold amount of time has been exceeded, input characteristics for the node into the trained machine learning model; and in response to inputting characteristics of the node into the trained machine learning model, receive, from the trained machine learning model, an indication of a future failure with respect to the node.

17. The non-transitory computer-readable medium of claim 16, further comprising program code executable by the processing device for causing the processing device to:
automatically execute the recovery operation for the node based on the indication of the future failure of the node.

18. The non-transitory computer-readable medium of claim 15, wherein the source of the failure is a configuration setting for the node, and wherein the program code is further executable by the processing device for causing the processing device to automatically execute the recovery operation by:
determining an adjustment to the configuration setting for the node to prevent reoccurrence of the failure with respect to the node;
transmitting a command to the node comprising the adjustment to the configuration setting, wherein the node is configured to execute the adjustment to the configuration setting in response to receiving the command; and
receiving, from the node, confirmation of the adjustment to the configuration setting.

19. The non-transitory computer-readable medium of claim 15, wherein the source of the failure is a workload for the node, and wherein the program code is further executable by the processing device for causing the processing device to automatically execute the recovery operation by:
determining, based on the source of the failure, that the workload for the node exceeds a workload threshold;
determining a portion of the workload for the node to be redirected to cause the workload for the node to be below the workload threshold; and
redirecting at least the portion of the workload to another node in the plurality of nodes.

20. The non-transitory computer-readable medium of claim 15, further comprising program code executable by the processing device for causing the processing device to automatically execute the recovery operation by:
determining, based on the source of the failure, a security risk with respect to the node; and
in response to determining the security risk, automatically isolating the node from other nodes in the plurality of nodes by:
preventing the node from accessing shared resources in the distributed computing environment;
transmitting a command to the node to disconnect from a network configured to communicatively couple the plurality of nodes in the distributed computing environment; and
determining that the node has disconnected from the network.

* * * * *